United States Patent [19]
Motoike

[11] Patent Number: 5,200,647
[45] Date of Patent: Apr. 6, 1993

[54] HIGH-SPEED SIGNAL MULTIPLEXING CIRCUIT FOR MULTIPLEXING HIGH-SPEED SIGNALS

[75] Inventor: Koichi Motoike, Yokohama, Japan

[73] Assignee: Kahushiki Kaisha Toshiba, Kawasaki, Japan

[21] Appl. No.: 746,723

[22] Filed: Aug. 19, 1991

[30] Foreign Application Priority Data

Aug. 20, 1990 [JP] Japan .................. 2-217161

[51] Int. Cl.$^5$ .......................... H03L 07/06
[52] U.S. Cl. .................. 307/241; 307/242; 307/271; 307/272.1; 328/154; 370/112
[58] Field of Search ............ 307/241, 242, 271, 272.1, 307/244; 377/47, 48; 328/105, 154; 370/112

[56] References Cited

U.S. PATENT DOCUMENTS

| | | | |
|---|---|---|---|
| 4,575,867 | 3/1986 | Hogue | 377/47 |
| 4,593,390 | 6/1986 | Hildebrand et al. | 370/112 |
| 4,648,105 | 3/1987 | Priebe et al. | 328/105 |
| 4,817,090 | 3/1989 | Pfennings et al. | 370/112 |
| 4,926,423 | 5/1990 | Zukowski | |
| 4,926,451 | 5/1990 | Yoshihara et al. | 307/271 |
| 5,083,049 | 1/1992 | Kagey | 307/272.1 |

FOREIGN PATENT DOCUMENTS 2573929 11/1984 France .

OTHER PUBLICATIONS

Akahori, Yuji et al., "A Multiplexer Employing Josephson Functional Gates," IEEE Transactions on Electron Devices, vol. ED-32, No. 6, Jun. 1985, pp. 1053-1056.
Pang, Y. et al., "Alternative Latches," Wireworld World, vol. 89, No. 1568 May 1, 1983, p. 63.
Brain, David, "EPLD Building Block Solutions for Serial Communications," New Electronics, vol. 18, No. 15, Jul. 1, 1985, pp. 59, 61-62.
Brain, David, "Flip-Flop Buffers Bidirectional Lines," Electronics Design, vol. 32, No. 3, Feb. 1, 1984, p. 156.

Primary Examiner—William L. Sikes
Assistant Examiner—Scott A. Ouellette
Attorney, Agent, or Firm—Finnegan, Henderson, Farabow, Garrett and Dunner

[57] ABSTRACT

In a high-speed signal multiplexing circuit, when data supplied to an input terminal of a flip-flop circuit differs from the data which has been latched in the flip-flop circuit, an exclusive OR circuit supplies a control signal to a clock signal input terminal of the flip-flop circuit. The flip-flop circuit latches the data supplies to the input terminal in response to the control signal. A data reading section generates a read signal in synchronism with a clock signal. The data latched in the flip-flop circuit is successively read out in response to the read signal.

11 Claims, 5 Drawing Sheets

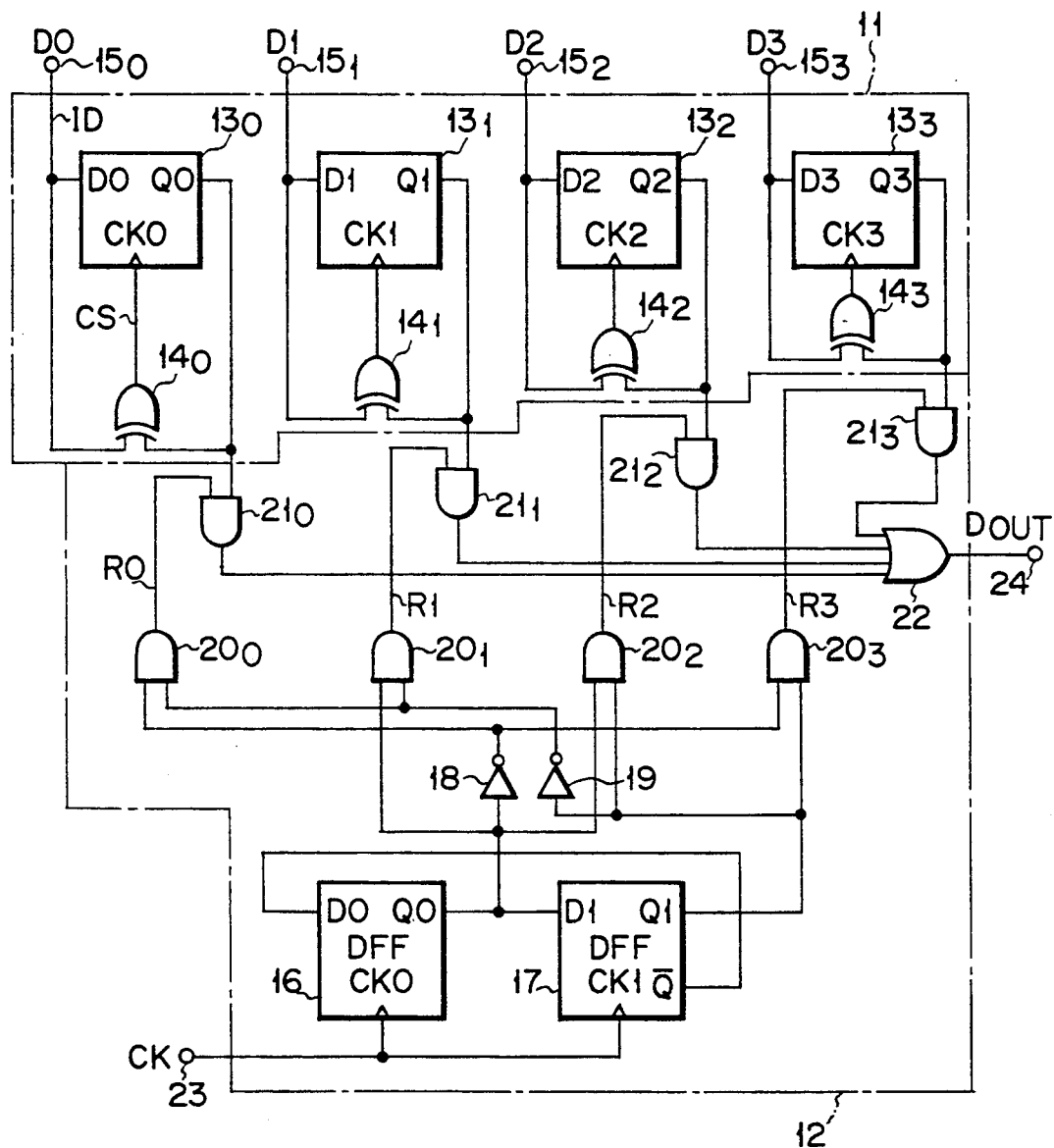
F I G. 1

HIGH-SPEED SIGNAL MULTIPLEXING CIRCUIT FOR MULTIPLEXING HIGH-SPEED SIGNALS

BACKGROUND OF THE INVENTION

1. Field of the Invention

This invention relates to a high-speed signal multiplexing circuit for multiplexing high-speed signals for use in an integrated circuit for a high-speed communication system or a measuring device for measuring high-speed signals.

2. Description of the Related Art

FIG. 4 shows a conventional high-speed signal multiplexing circuit.

A shift register section 31 includes D-type flip-flop circuits (hereinafter referred to as D flip-flop circuit) $32_0$, $32_1$, $32_2$, and $32_3$, and selector circuits $34_0$, $34_1$, $34_2$, and $34_3$ respectively connected to input terminals D of the D flip-flop circuits $32_0$, $32_1$, $32_2$ and $32_3$. Each of the selector circuits $34_0$, $34_1$, $34_2$ and $34_3$ comprises AND circuits $33_1$ and $33_2$ and an OR circuit $33_3$. The selector circuits $34_1$, $34_2$ and $34_3$ select either data $D_1$, $D_2$ and $D_3$ respectively supplied to input terminals $I_1$, $I_2$ and $I_3$ or data supplied from output terminals Q of the flip-flop circuits $32_0$, $32_1$ and $32_2$ in response to a load signal LS supplied from a load signal generating section 35 (to be described later). The selector circuit $34_0$ selects either data $D_s$ supplied to an input terminal $I_s$ or data $D_0$ supplied to an input terminal $I_0$ in response to a load signal LS.

A clock signal CK is inverted by an inverter IV, and then supplied to clock signal input terminals $CK_0$ to $CK_3$ of the D flip-flop circuits $32_0$ to $32_3$. Data latched by the D flip-flop circuits $32_0$ to $32_3$ are successively shifted in response to clock signals CK, and output through output terminal $D_{OUT}$. Thus, data latched in the shift register section 31 is output through the output terminal $D_{OUT}$ by four shifting operations.

The load signal generating section 35 generates a load signal LS for causing data $D_S$ and $D_0$ to $D_3$ supplied to the input terminals $I_s$ and $I_0$ to $I_3$ to be latched by the D flip-flop circuits $32_0$ to $32_3$ by every four shift operations. The load signal LS is obtained by ¼ frequency-dividing the clock signal CK, as is shown in FIG. 5.

The load signal generating section 35 includes D flip-flop circuits 36 and 37, a NOR circuit 38 for generating a load signal from outputs of the flip-flop circuits 36 and 37, and a selector circuit 40 connected to an input terminal D of the D flip-flop 36. The selector circuit 40 comprises AND circuits $39_1$ and $39_2$ and a OR circuit $39_3$. An output terminal $Q_1$ of the flip-flop circuit 36 is connected to an output terminal SO.

The selector circuit 40 switches the control system of the selector circuits $34_0$ to $34_3$ between an external synchronous mode and an internal synchronous mode. In other words, the selector circuit 40 selects either a signal output from an output terminal $\overline{Q}$ of the D flip-flop circuit 37 or a ¼ frequency-divided clock signal SI in response to an inhibit signal INH. The load signal generating section 35 generates a load signal LS in response to a signal SI selected by the selector circuit 40 in the case of the external synchronous mode, and in response to an output signal of the D flip-flop circuit 37 selected by the selector 40 in the case of the internal synchronous mode.

In the above-described conventional high-speed signal multiplexing circuit, the selector circuits $34_0$ to $34_3$ is controlled by a load signal LS generated asynchronously with input data. To generate a load signal LS in the external synchronous mode, the high-speed signal multiplexing circuit must control the phases of a clock signal CK, a signal SI having a frequency of four times that of the clock signal, and data $D_s$, $D_0$ to $D_3$. Hence, the circuit design is complicated and it is difficult to increase the margin of the operation of the circuit.

Especially in a circuit operated by a signal having a high frequency of a GHz band, since signal transmission is performed by a distributed constant circuit and the resolution of the phase control is of pico-second order, it is quite difficult to control the phase of a signal externally.

On the other hand, to generate a load signal LS in the internal synchronous mode, it is only necessary to control the phases of the clock signal and data $D_s$, $D_0$ to $D_3$, since a load signal LS is generated from a clock signal to control the selector circuits $34_0$ to $34_3$. However, in this case, to increase the operation margin of the entire circuit, the phases of the data, the load signal, and the clock signal for operating the shift register section 31 must be controlled. Therefore, the circuit design is complicated.

Thus, also in the case of controlling a phase in the internal synchronous mode, an operation of a wide margin in a high-frequency band in a GHz band cannot be achieved unless the circuit is designed with defining a signal which is to be phase-controlled.

SUMMARY OF THE INVENTION

It is accordingly an object of the present invention to provide a high-speed signal multiplexing circuit wherein the phases of signals are controlled easily and the margin of a circuit operation in a high-frequency band is increased, thereby improving the performance in high-frequency signal processing.

The object is achieved by a high-speed signal multiplexing circuit for multiplexing a signal at a high speed, comprising a plurality of latch means for latching 1-bit data supplied from an external circuit. Latch control means is provided for each latch means for causing the latch means to latch the supplied data, when the supplied data differs from the data which has been latched in the latch means. Generating means is provided for generating a read signal for successively reading data latched in the latch means in synchronism with a clock signal, and reading means is provided for successively reading data latched in the latch means in response to the read signal.

According to the present invention, when data supplied to the latch means differs from the data which has been latched therein, the latch control means causes the latch means to latch the data supplied thereto. Hence, it is assured that the latch means latches updated data not in synchronism with a clock signal. Moreover, the generating means generates a read signal in synchronism with the clock signal, and the read signal causes the data latched in the latch means to be read. Therefore, it is easy to control the timings of latching data and reading the latched data, and the margin of the operation is increased with a simple circuit, even if the circuit is operated in a high-frequency band.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a circuit diagram showing an embodiment of the present invention;

DETAILED DESCRIPTION OF THE PREFERRED EMBODIMENTS

An embodiment of the present invention will be described with reference to the accompanying drawings.

FIG. 1 shows a high-speed signal multiplexing circuit comprising a latch section 11 and a data reading section 12.

The latch section 11 latches 4-bit parallel data, bit by bit, supplied from an external circuit (not shown). The latch circuit 11 is comprised of D flip-flop circuits $13_0$, $13_1$, $13_2$ and $13_3$ and exclusive OR circuits $14_0$, $14_1$, $14_2$ and $14_3$ respectively connected to the D flip-flop circuits $13_0$, $13_1$, $13_2$ and $13_3$.

More specifically, input terminals $D_0$ to $D_3$ of the D flip-flop circuits $13_0$ to $13_3$ are respectively connected to data input terminals $15_0$ to $15_3$ and first input terminals of the respective exclusive OR circuits $14_0$ to $14_3$. Output terminals $Q_0$ to $Q_3$ of the D flip-flop circuits $13_0$ to $13_3$ are connected to second input terminals of the respective exclusive OR circuits $14_0$ to $14_3$. The output terminals of the D flip-flop circuits $13_0$ to $13_3$ are connected to clock signal input terminals $CK_0$ to $CK_3$.

In the latch section 11, when data supplied to the data input terminals $15_0$ to $15_3$ differ from the data which has been latched in D flip-flop circuits $13_0$ to $13_3$, the exclusive OR circuits $14_0$ to $14_3$ output a control signal CS of high level. The control signal CS is supplied to the clock signal input terminals $CK_0$ to $CK_3$ of the D flip-flop circuits $13_0$ to $13_3$. The D flip-flop circuits $13_0$ to $13_3$, to which the control signal CS is supplied, latch the data supplied to the data input terminals $15_0$ to $15_3$.

Figure 2:
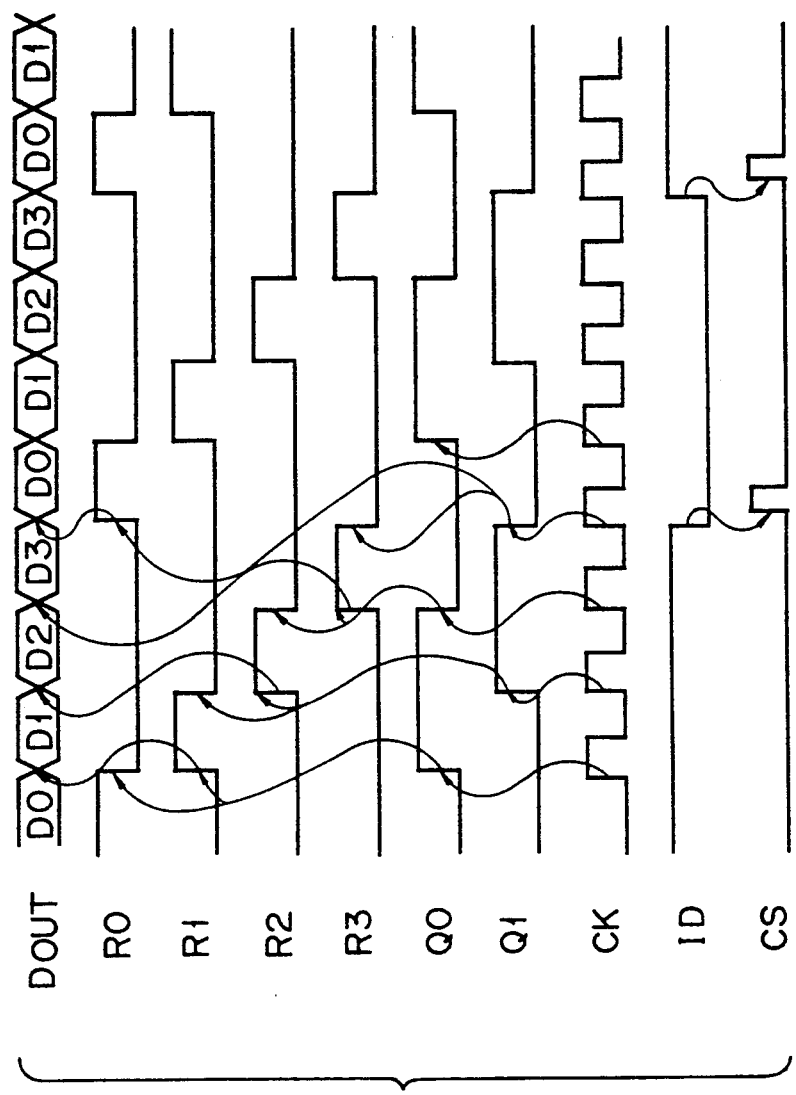
FIG. 2 is a timing chart for explaining an operation of the circuit shown in FIG. 1.

As is shown in FIG. 2, data ID supplied to the input terminals $15_0$ to $15_3$ is updated at every 4 clocks. With the above structure, updated data is surely latched without using a clock signal unlike in the conventional device.

The data reading section 12 reads data which has been latched in the D flip-flop circuits $13_0$ to $13_3$ in the latch section 11, consecutively in synchronism with the clock signal CK. The data reading section 12 comprises D flip-flop circuits 16 and 17, inverters 18 and 19, AND circuits $20_0$ to $20_3$, AND circuits $21_0$ to $21_3$, and an OR circuit 22. The D flip-flop circuits 16 and 17 ¼ frequency-divide the clock signal CK as indicated by $Q_0$ and $Q_1$ in FIG. 2. The inverter circuits 18 and 19 generate read signals $R_0$ to $R_3$ from the signal ¼ frequency-divided by the D flip-flop circuits 16 and 17. The AND circuits $21_0$ to $21_3$ consecutively fetch data from the D flip-flop circuits $13_0$ to $13_3$ in response to the read signals $R_0$ to $R_3$. The OR circuit 22 outputs data fetched by the AND circuits $21_0$ to $21_3$ to an output terminal 24.

Clock signal input terminals $CK_0$ and $CK_1$ of the D flip-flop circuits 16 and 17 are connected to a clock signal input terminal 23. An input terminal $D_0$ of the D flip-flop circuit 16 is connected to an output terminal $\overline{Q}$ of the D flip-flop circuit 17. An output terminal $Q_0$ of the D flip-flop circuit 16 is connected to an input terminal $D_1$ of the D flip-flop circuit 17, and first input terminals of the AND circuits $20_1$ and $20_2$. The terminal $Q_0$ is also connected to first input terminals of the AND circuits $20_0$ and $20_3$ via the inverter circuit 18.

An output terminal $Q_1$ of the D flip-flop circuit 17 is connected to second input terminals of the AND circuits $20_2$ and $20_3$. It is also connected to second input terminals of the AND circuits $20_0$ and $20_1$ via the inverter circuit 19. The output terminals of the AND circuits $20_0$ to $20_3$ are respectively connected to first input terminals of the AND circuits $21_0$ to $21_3$. Second input terminals thereof are respectively connected to output terminals $Q_0$ to $Q_3$ of the D flip-flop circuits $13_0$ to $13_3$. The output terminals of the AND circuits $21_0$ to $21_3$ are connected to input terminals to the OR circuit 22, the output terminal of which is connected to the output terminal 24.

As is shown in FIG. 2, the data reading section 12 generates read signals $R_0$ to $R_3$ in response to a clock signal CK supplied to the clock signal input terminal 23. The read signals $R_0$ to $R_3$ are supplied to the AND circuits $21_0$ to $21_3$. The data successively read by the AND circuits $21_0$ to $21_3$ from the D flip-flop circuits $13_0$ to $13_3$ is supplied to the OR circuit 22, and thereafter output in succession through the output terminal 24.

According to the above embodiment, if data supplied to the input terminals $15_0$ to $15_3$ differ data which has been latched in the D flip-flop circuits $13_0$ to $13_3$, the exclusive OR circuits $14_0$ to $14_3$ cause the D flip-flop circuits $13_0$ to $13_3$ to latch the data supplied to the input terminals $15_0$ to $15_3$. Hence, the updated data is surely latched without using a clock signal, unlike in the conventional art. Hence, the wide margin of the operation in a high-frequency band is ensured, thereby improving the reliability of the operation.

Since the latch section 11 need not latch data every four clocks, it can operate at a speed four times as that the conventional device, without an additional operation. Hence, the circuit has a more simple design and consumes less power than the conventional device.

Moreover, since the data reading section 12 generates merely a read signal in synchronism with a clock signal, the circuit design thereof is simple.

Figure 3:
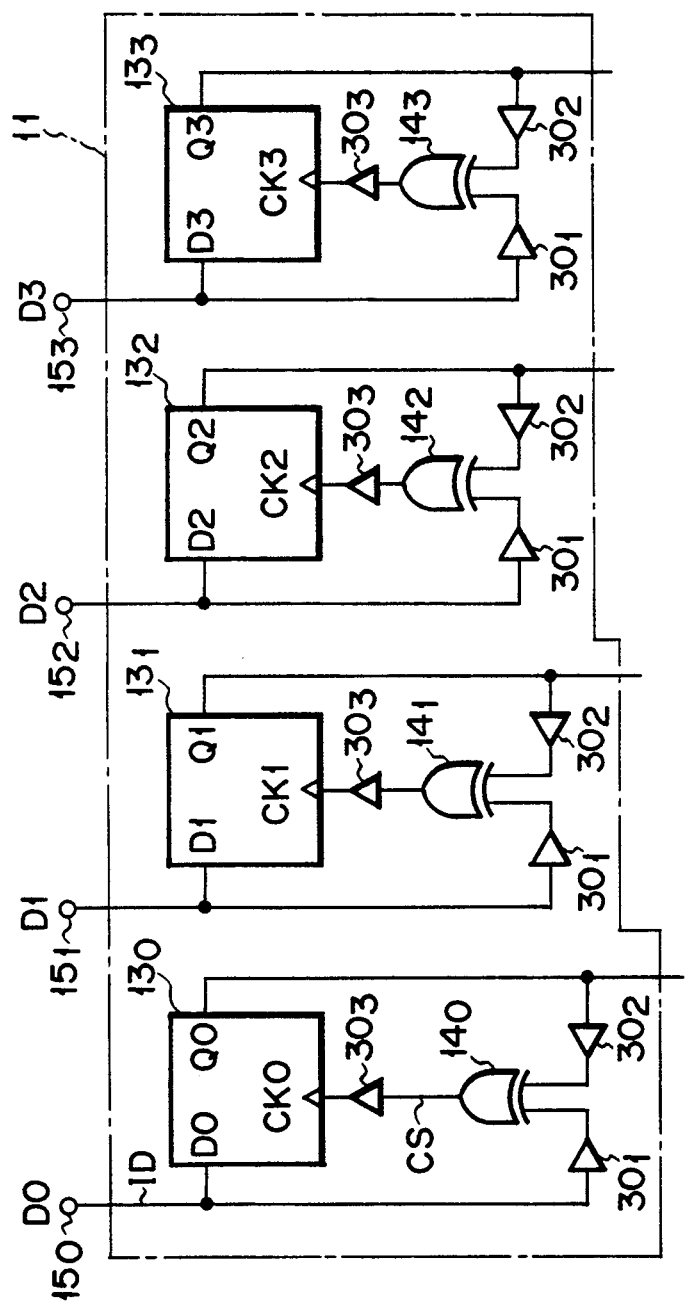
FIG. 3 is a circuit diagram showing a modification of the latch circuit shown in FIG. 1.
Figure 4:
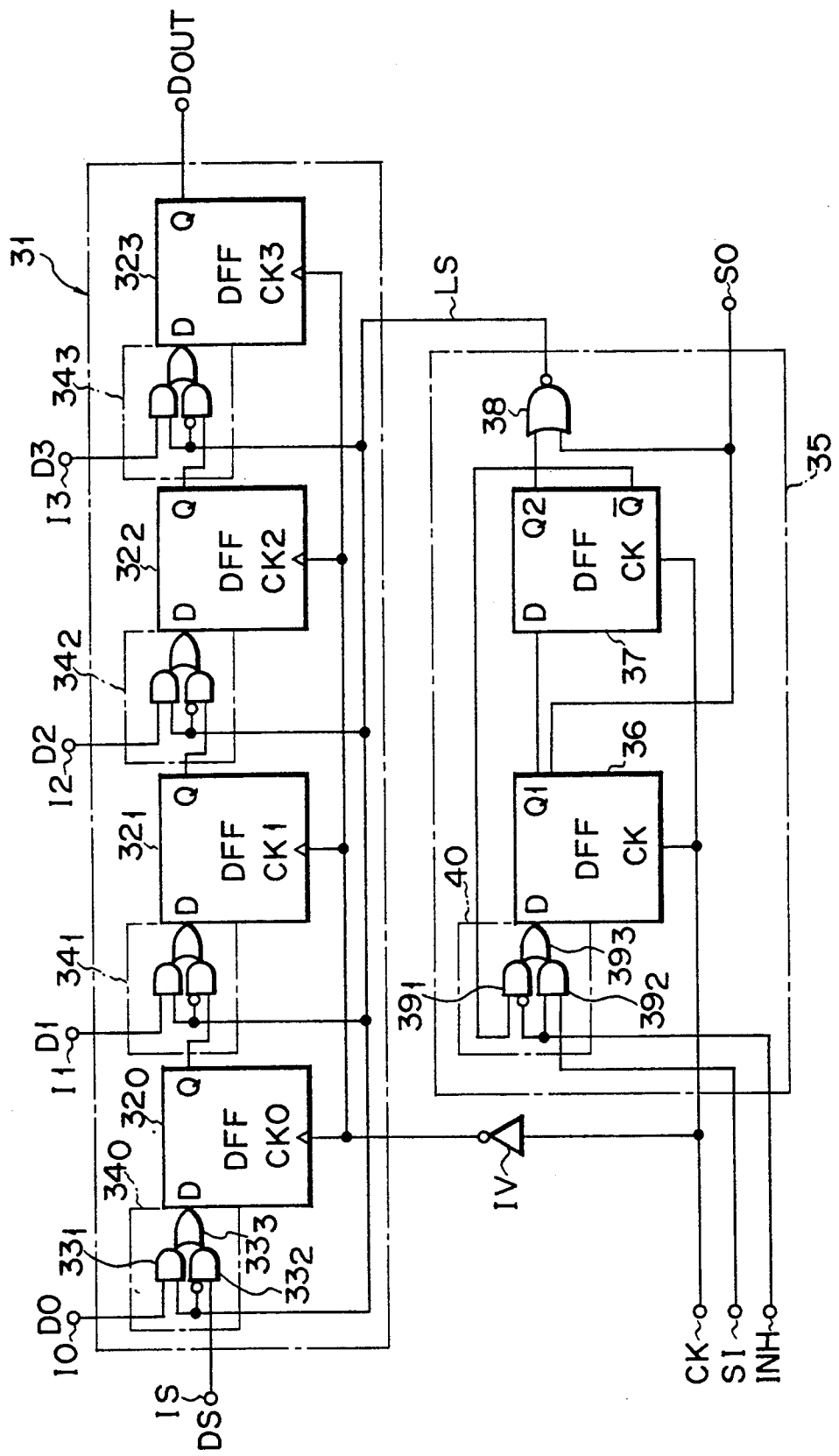
FIG. 4 is a circuit diagram showing a conventional high-speed signal multiplexing circuit.
Figure 5:
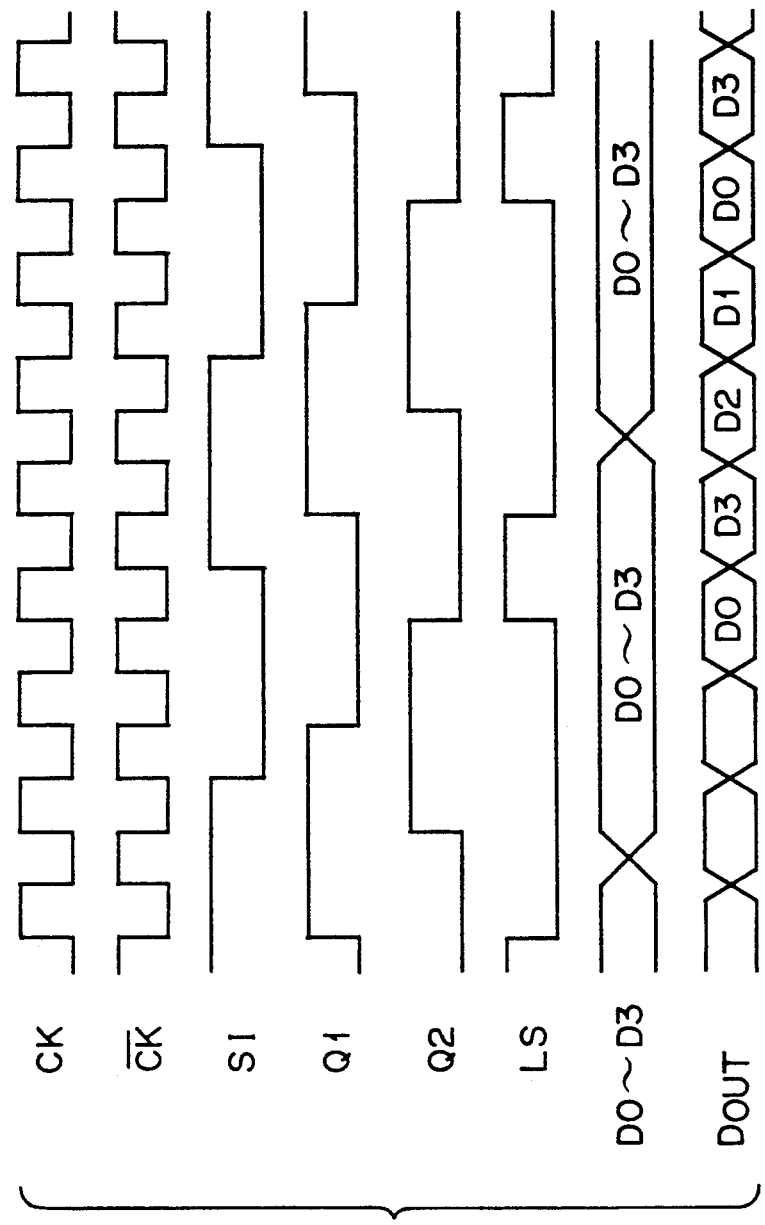
FIG. 5 is a timing chart for explaining an operation of the circuit shown in FIG. 4.

FIG. 3 shows a modification of the latch section 11. As shown in FIG. 3, buffer circuits $30_1$ and $30_2$ are connected to the input terminals of each of the exclusive OR circuits $14_0$ to $14_3$, and a buffer circuit $30_3$ is connected to the output terminal thereof. By virtue of the buffer circuits $30_1$, $30_2$ and $30_3$, the latch section 11 can be applied to a signal of a low-frequency band.

The buffer circuits need not be provided to both input terminals and the output terminal of each of the exclusive OR circuit $14_0$ to $14_3$, but can be provided only to the input terminals.

This invention is not limited to the above embodiments, but can be applied to a circuit for latching updated data by using only the latch section 11. Further, the signal mulitplexing circuit of the present invention can basically be constituted by a pair of D flip-flop circuit and exclusive OR circuit, to latch updated data.

Furthermore, various modifications can be made within the spirit and scope of the invention.

What is claimed is:

1. A high-speed signal multiplexing circuit for multiplexing a signal at a high speed, comprising:
   a plurality of latch means for latching 1-bit data;
   latch control means, provided for each latch means, for causing the latch means to latch 1-bit data supplied thereto, when the 1-bit data supplied to the latch means differs from 1-bit data which has been latched in the latch means;
   generating means for generating a read signal for successively reading data latched in said latch means in synchronism with a clock signal; and
   reading means for successively reading data latched in said plurality of latch means in response to the read signal.

2. A circuit according to claim 1, wherein each of said latch means is constituted by a flip-flop circuit, each having a data input terminal for receiving data, a control signal input terminal for receiving a control signal for latching the data supplied from the latch control means, and an output terminal for outputting latched data.

3. A circuit according to claim 1, wherein said latch control means is constituted by an exclusive OR circuit.

4. A circuit according to claim 1, wherein said generating means is constituted by first and second flip-flop circuits for frequency-dividing a clock signal, first and second inverter circuits for inverting signals frequency-divided by said first and second flip-flop circuits, and a plurality of AND circuits for receiving outputs of said first and second inverter circuits and said first and second flip-flop circuits and generating a read signal.

5. A circuit according to claim 1, wherein said reading means is constituted by an AND circuit having an input terminal which receives the read signal and another input terminal which receives data output from said latch means.

6. A high-speed signal multiplexing circuit for multiplexing a signal at a high speed, comprising:
   a plurality of flip-flop circuits for latching data, each having a data input terminal for receiving data, a control signal input terminal for receiving a control signal for latching the data supplied to the data input terminal, and an output terminal for outputting latched data;
   a plurality of exclusive OR circuits, output terminals of which are respectively connected to the control signal input terminals of said flip-flop circuits, said exclusive OR circuits outputting a control signal for causing each flip-flop circuit to latch the supplied data, when the supplied data differs from the data which has been latched in the flip-flop circuit;
   a generating circuit for generating a read signal for successively reading data latched in said flip-flop circuits in synchronism with a clock signal; and
   a reading circuit for successively reading data latched in said flip-flop circuits in response to the read signal.

7. A circuit according to claim 6, wherein said generating circuit is constituted by first and second flip-flop circuits for frequency-dividing a clock signal, first and second inverter circuits for inverting signals frequency-divided by said first and second flip-flop circuits, and a plurality of AND circuits for receiving outputs of said first and second inverter circuits and said first and second flip-flop circuits and generating read signals.

8. A circuit according to claim 6, wherein said reading circuit is constituted by an AND circuit having an input terminal which receives the read signals and having another input terminal which receives data output from said flip-flop circuits.

9. A circuit for extracting an updated signal, comprising:
   a flip-flop circuit for latching data, having a data input terminal for receiving data, a control signal input terminal for receiving a control signal for latching the data supplied to the input terminal, and an output terminal for outputting the latched data; and
   an exclusive OR circuit having an output terminal which is connected to the control signal input terminal of said flip-flop circuit, said exclusive OR circuit outputting a control signal for causing the flip-flop circuit to latch the supplied data, when the supplied data differs from the data which has been latched in the flip-flop circuit.

10. A circuit according to claim 6, wherein each of said exclusive OR circuits has a pair of input terminals and respective buffer circuits are respectively connected to said input terminal pairs of said exclusive OR circuits.

11. A circuit according to claim 6, wherein the output terminal of each of said exclusive OR circuits is connected through a buffer circuit to the control signal input terminal of the associated flip-flop circuit.

* * * * *